United States Patent [19]

Rumfield

[11] Patent Number: 4,821,520
[45] Date of Patent: Apr. 18, 1989

[54] TURBOCHARGER PROTECTOR SCREEN

[76] Inventor: Michael A. Rumfield, Rte. 2, Box 3121, Cleveland, Tex. 77327

[21] Appl. No.: 222,743

[22] Filed: Jul. 22, 1988

[51] Int. Cl.$^4$ ............... F02C 7/055; B01D 39/12; F02G 3/02
[52] U.S. Cl. ........................... 60/614; 55/511; 55/525; 415/121 G
[58] Field of Search ............... 60/39.092, 39.11, 614; 415/121 G; 55/502, 506, 511, 525

[56] References Cited

U.S. PATENT DOCUMENTS

| | | | |
|---|---|---|---|
| 1,108,094 | 8/1914 | Ferguson | 55/511 X |
| 1,147,279 | 7/1915 | Sweetland | 55/525 X |
| 1,967,713 | 7/1934 | Kelley | 415/121 GX |
| 2,111,448 | 3/1938 | Hoffman | 55/511 X |
| 3,286,459 | 11/1966 | Ephraim | 60/614 |
| 3,352,104 | 11/1967 | Duerr | 60/614 |
| 3,735,587 | 5/1973 | Addie et al. | 415/121 GX |
| 4,077,739 | 3/1978 | Heilenbach | 60/39.092 X |

FOREIGN PATENT DOCUMENTS 129926  2/1978  German Democratic Rep. ... 60/614

Primary Examiner—Michael Koczo
Attorney, Agent, or Firm—Richard C. Litman

[57] ABSTRACT

A protector screen assembly is disclosed to protect the turbine inlet of a turbocharger installed on an internal combustion engine. The protector screen prevents debris from entering the turbocharger in case of engine failure such as a broken valve. The protector screen is heat resistant and easily installed between the exhaust manifold and turbocharger turbine inlet.

5 Claims, 2 Drawing Sheets

Fig. 5
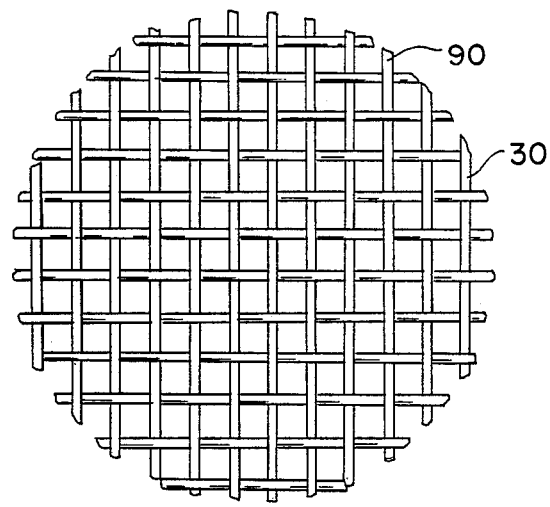
Fig. 6
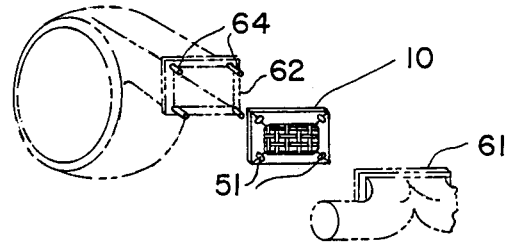
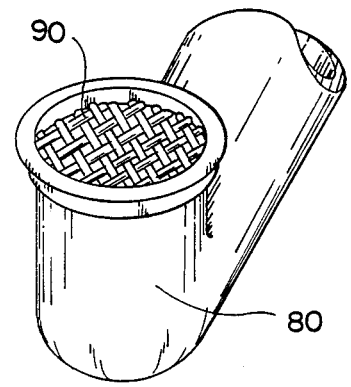
Fig. 7

TURBOCHARGER PROTECTOR SCREEN

BACKGROUND OF THE INVENTION

1. Field of the Invention

The invention relates to a screen for protecting the turbine blades of an exhaust gas turbocharger, and more particularly, the invention is directed to an improved construction of a screen and screen support which protects the turbocharger from damaging matter in the exhaust gas.

Internal combustion engines in cars, trucks and utility vehicles are becoming increasingly important. In case of an engine failure, such as a broken valve, debris from the broken engine part often enters the turbocharger, causing severe damage to the turbine blades and other components of the turbocharger. Thus, it is desirable to provide a turbocharger protector screen between the exhaust manifold of the engine and the turbocharger turbine inlet port. The screen will catch or stop the debris, preventing it from entering and damaging the turbocharger.

The protector screen during normal engine operation will be exposed to the typically high operating temperatures of the engine. In the case of a valve failure, the screen may be exposed to even higher temperatures due to combustion products flowing through the exhaust manifold. Consequently, it is also desirable to provide a turbocharger protector screen which is capable of withstanding high temperatures.

The invention is a turbocharger protector screen which provides strength and temperature resistance. The invention can be used on a variety of types of internal combustion engines having a turbocharger, and the method of construction is more fully described herein.

2. Description of the Prior Art

Various prior art turbocharger protector screens, devices and the like, as well as their apparatuses and the method of their construction in general, are known and found to be exemplary of the U.S. prior art. U.S. Pat. No. 3,352,104 to Duerr discloses a screen for protecting the blades of a turbocharger from damaging debris. The invention features a screen that is especially designed to reduce internal stresses due to thermal expansion. Other U.S. Patents, such as U.S. Pat. No. 3,286,459 to Ephraim and U.S. Pat. No. 3,735,587 to Addle, et al teach various types of turbocharger protector screens which control thermal expansion of the screen element.

These patents or known prior uses teach and disclose various types of turbocharger protector screens and the like, as well as methods of their construction; but none of them, whether taken singly or in combination, disclose the specific details of the combination of the invention in such a way as to bear upon the claims of the present invention.

SUMMARY OF THE INVENTION

An object, advantage and feature of the invention is to provide a novel turbocharger protector screen that is highly effective at preventing turbocharger damage, and which lends itself to use in many types of turbocharged engines.

Another object of the invention is directed further to a construction of a turbocharger protector screen which is capable of withstanding high operating temperatures, to wit, the employment of a stainless steel alloy screen formed in a woven mesh.

Still another object of the invention is to provide a novel and improved construction of a turbocharger screen which is inexpensive, and which is easily and quickly installed in most applications. The entire screen assembly is constructed to be very thin, allowing installation without modification of the engine or the exhaust system. Thus, the invention is particularly suited to installation in engines which are in service without a protector screen, as well as installation in new engines.

Yet another object of the invention is to provide a construction of a screen support which also allows the screen to expand and contract due to the thermal stresses caused by temperature fluctuations. The woven mesh screen used and the screen support construction cooperate to reduce breakage or failure of the screen due to thermal stress, and thus extended screen life is obtained.

These, together with other objects and advantages of the invention reside in the details of the process and the operation thereof, as is described and claimed more fully hereinafter.

DESCRIPTION OF THE SEVERAL VIEWS OF THE DRAWINGS

FIG. 5 is a top view of an alternative embodiment of the invention.

FIG. 6 is an exploded perspective view of the preferred embodiment and best mode of the present invention in use, showing the invention installed between an engine exhaust manifold and turbocharger inlet.

FIG. 7 is a perspective view of an alternative embodiment of the invention in use.

Similar reference characters denote similar parts throughout the drawings.

DESCRIPTION OF THE PREFERRED EMBODIMENTS OF THE INVENTION

Figure 1:
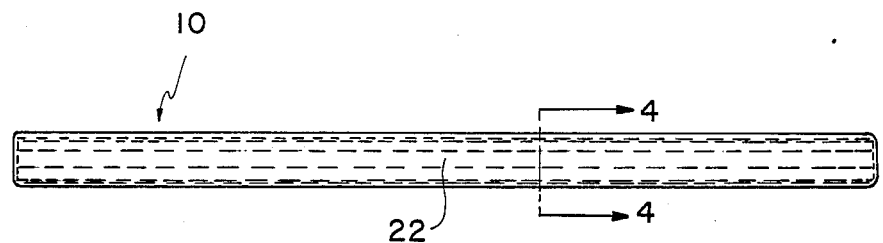
FIG. 1 is a side view of the present invention illustrating a typical construction of the turbocharger protector screen according to a preferred embodiment and best mode of the present invention.
Figure 2:
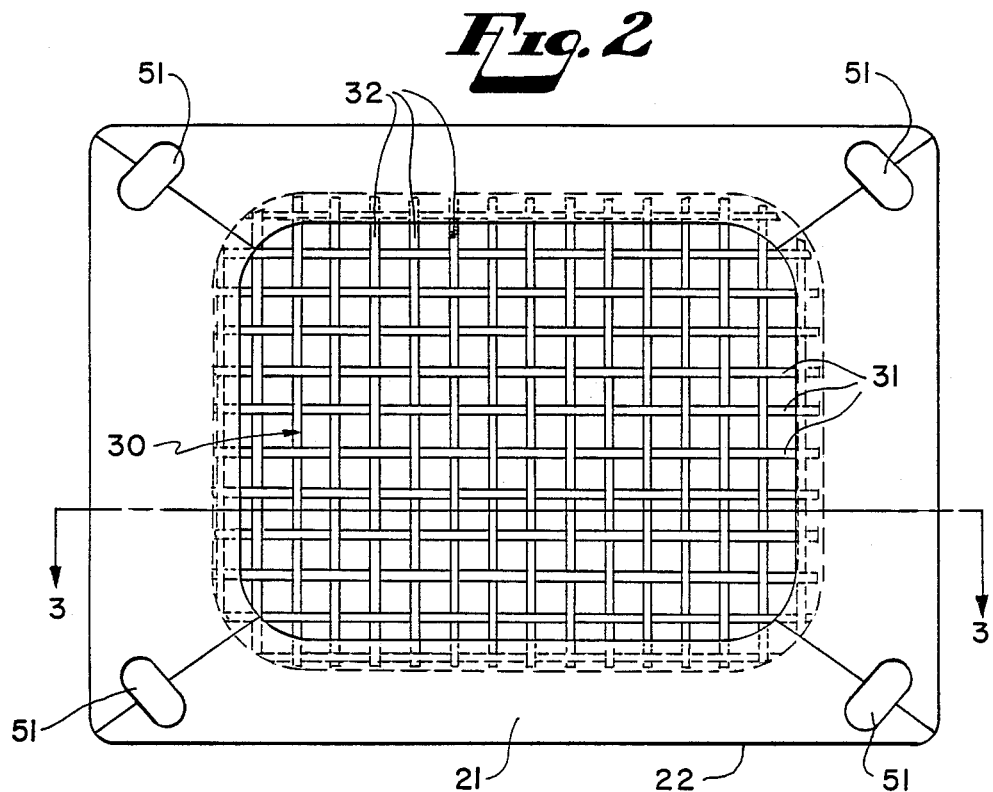
FIG. 2 is a top view of the turbocharger protector screen according to a preferred embodiment of the present invention.

Referring now to the drawings, there is shown in FIGS. 1 through 4 a rectangular turbocharger protector screen, generally designated 10, comprising a wire mesh screen 30, surrounded by a heat resistant internal gasket 40, partially enclosed by a metal frame 20.

The turbocharger protector screen 10 is installed between the exhaust manifold outlet 61 and the turbocharger turbine inlet 62 of an internal combustion engine as shown in FIG. 6. The metal frame 20 has a plurality of holes 51 drilled therethrough and is secured by the turbocharger mounting bolts 64.

Again as shown in FIGS. 1 through 4, the preferred embodiment of the invention includes a wire mesh screen 30. In the preferred embodiment, the screen 30 includes two perpendicular sets of parallel wires. The wires 31 in the "warp" direction are bent slightly. The wires in the "weft" direction 32 are bent more acutely. The screen 30 is generally flat and rectangular in shape, with rounded corners. The screen 30 is bordered by several layers of insulation material 40. The border insulation material 40 may be a reinforced fiberglas or any suitable polymeric material. The border provides lateral support for the screen 30, and absorbs any expansion of the screen 30 due to high temperatures. The assembly comprising the screen 30 and surrounding border assembly 40 is contained in a sheet metal housing 20 having sides 22 and top and bottom surfaces 21 and 23. The housing 20 may be formed from a unitary folded sheet metal frame. The top and bottom surfaces 21 and 23 form a border around the screen 30, with a central aperture. The top and bottom surfaces of the housing 20 overlap the peripheral edges of the screen 30. Thus, the housing 20 holds the screen 30 in place. The housing 20 also features holes 51 at each corner. The holes are positioned to receive the turbocharger mounting bolts 63.

In use, the turbocharger protector screen 10 allows a smooth flow of exhaust gases through the screen 30. In the case of a valve failure or other engine damage, the screen will catch or stop the debris.

The wire mesh screen 30 of the invention may be constructed of any suitable heat resistant mesh material. However, certain types of woven metallic mesh have been found to provide superior performance. For example, the mesh may be constructed of a high nickel content stainless steel alloy. Type 330 austenitic stainless steel alloy may be employed for its good resistance to carburization and to heat and thermal shock. Type 330 alloy is composed of 34.00% to 37.00% nickel, 17.00% to 20.00% chromium, 0.75% to 1.50% silicon, 0.030% sulfur, 0.040% phosphorus, 2.00% manganese, and 0.08% carbon. This alloy has been found to create a wire mesh which has a melting point of 2500 to 2600 degrees F. The alloy remains strong above 1500 degrees F. Thus, such an alloy is well suited to use in the present invention. Engine temperatures in the turbine inlet often reach 600 to 900 degrees F. In the case of valve failure, the temperatures may reach as high as 1500 degrees F., as combustion products flow directly through the exhaust manifold.

Figure 3:
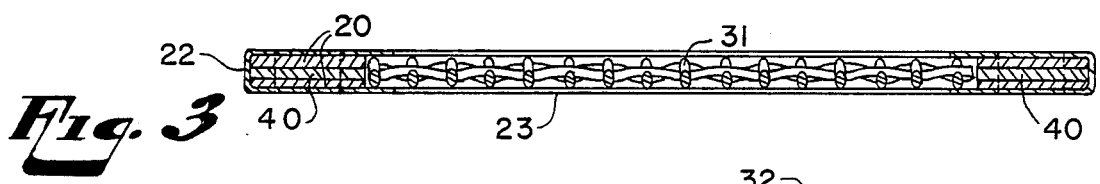
FIG. 3 is a section view of the present invention along line 3—3 of FIG. 2.
Figure 4:
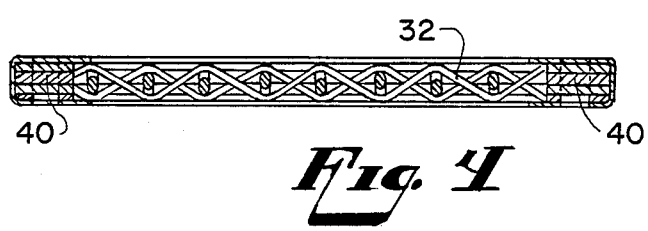
FIG. 4 is a section view of the present invention along line 4—4 of FIG. 1.

The wire mesh may be constructed of any suitable screen or mesh style, but a woven wire mesh is preferred. For example, a plain weave industrial wire cloth may be employed. The cloth, as shown in FIGS. 3 and 4, is formed from two sets of parallel wires which are woven perpendicular to each other. The cloth has wires in the "warp" direction which are nearly straight. The wires in the "weft" direction are curved more acutely. This construction allows the material to absorb thermal expansion and minimizes the associated stresses. The mesh size of the wire cloth may be of the standard 0.080 inch size, having a cross sectional area of 0.00503 square inches. The weight of the steel wire is 58.58 feet per pound.

FIGS. 5 and 7 show an alternate embodiment of the invention, comprising a circular screen 90. The wire mesh material of circular screen 90 is similar to the screen material 30 used in the rectangular embodiment of the invention. The embodiment of FIGS. 5 and 7 may be installed in some exhaust manifolds having a circular cross section to serve as a turbocharger protector screen. In this embodiment, the circular screen 90 fits into the recessed end of an exhaust pipe 80 feeding into an exhaust collector, and shown in FIG. 7.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

I claim:

1. A screen assembly for use with an internal combustion engine, adapted to cover an exhaust gas driven turbine having an inlet port for exhaust gases, said screen assembly adapted to protect said gas driven turbine from debris or particulate matter, comprising;
    a housing portion mounted across said turbine inlet port, said housing portion defining an exhaust gas flow aperture therethrough;
    a screen member disposed within said housing portion, said screen member spanning said exhaust gas flow aperture; and
    a gasket member between said housing portion and said screen member, said gasket member permitting thermal expansion of said screen member within said housing portion.

2. A screen assembly for use with an internal combustion engine, according to claim 1, wherein;
    said screen member is integral, being formed from a substantially flat woven wire mesh member, said woven wire mesh member being formed from two perpendicular sets of parallel wires.

3. A screen assembly for use with an internal combustion engine, according to claim 2, wherein;
    said wire mesh member is woven so that one of said sets of parallel wires is crimped at a greater angle than the crimp of the other set of parallel wires.

4. A screen assembly for use with an internal combustion engine, according to claim 1, wherein;
    said housing portion is integral, being formed by a folded sheet, said housing portion substantially covering said gasket member and partially covering the edges of said screen member.

5. A screen assembly for use with an internal combustion engine, according to claim 1, further including;
    means for attaching and sealing said housing portion to said exhaust gas driven turbine inlet.

* * * * *